US012563082B2

(12) United States Patent
Alam et al.

(10) Patent No.: US 12,563,082 B2
(45) Date of Patent: Feb. 24, 2026

(54) BATTLE TWIN FOR ENHANCED OT SECURITY

(71) Applicants: Muhammad Masoom Alam, Doha (QA); Muhammad Laiq, Peshawar (PK); Hamad Saleh Hadeed, Doha (QA)

(72) Inventors: Muhammad Masoom Alam, Doha (QA); Muhammad Laiq, Peshawar (PK); Hamad Saleh Hadeed, Doha (QA)

(73) Assignee: Cytomate Solutions and Services, Doha (QA)

( * ) Notice: Subject to any disclaimer, the term of this patent is extended or adjusted under 35 U.S.C. 154(b) by 0 days.

(21) Appl. No.: 18/463,311

(22) Filed: Sep. 8, 2023

(65) Prior Publication Data

US 2025/0141908 A1 May 1, 2025

(51) Int. Cl.
*H04L 9/40* (2022.01)
(52) U.S. Cl.
CPC ...... *H04L 63/1433* (2013.01); *H04L 63/1416* (2013.01)
(58) Field of Classification Search
None
See application file for complete search history.

(56) References Cited

U.S. PATENT DOCUMENTS

| | | | | |
|---|---|---|---|---|
| 9,628,501 | B2 * | 4/2017 | Datta Ray | .......... G06Q 10/0635 |
| 9,875,360 | B1 * | 1/2018 | Grossman | ............... A63F 13/75 |
| 2018/0018463 | A1 * | 1/2018 | Grossman | ............... A63F 13/75 |
| 2021/0084056 | A1 * | 3/2021 | Abbaszadeh | ......... H04L 9/0858 |
| 2024/0089284 | A1 * | 3/2024 | Rieger | ............... H04L 63/1433 |
| 2024/0303344 | A1 * | 9/2024 | Chiscariu | ................ G06F 21/53 |
| 2024/0419809 | A1 * | 12/2024 | Finke | .................... G06F 21/577 |

* cited by examiner

*Primary Examiner* — Joseph P Hirl
*Assistant Examiner* — Hassan Saadoun

(57) ABSTRACT

Current OT security solutions mostly provide defensive security involving monitoring and network segmentation. However, offensive security, proven effective in IT systems, is not easily applicable to OT systems due to its sensitive nature and high availability requirements. To conduct offensive security measures in OT networks, the concept of Digital Twins emerges as a viable solution but with limited progress in developing virtual replicas that accurately simulate real environments. Further, the process of creating such replicas is inherently complex and time-consuming, often involving extensive manual work. The present invention discloses an environment named as "Battle Twin," a specialized playground designed for breach and attack simulations specifically designed for OT networks. Battle Twin focuses on mimicking the security posture of the underlying network rather than replicating its production or behavioral aspects. By leveraging Battle Twin, security experts may effectively test and evaluate offensive security strategies without even touching real OT environments.

18 Claims, 2 Drawing Sheets

BATTLE TWIN FOR ENHANCED OT SECURITY

BACKGROUND

The disclosed embodiments relate to the cyber security of operational technology (OT) and industrial control systems (ICS).

Industrial control systems (ICS) have the vital function of continuously monitoring and automatically controlling critical industrial infrastructures in real time. ICS utilizes industrial communication protocols, which may be designed for closed environments and typically lack built-in security mechanisms. With the advent of Industry 4.0, Industrial control systems are becoming increasingly interconnected with the Internet, making them more vulnerable to cyber-attacks. It is considered that more than 40% of global ICSs faced malicious activity in the second half of 2022. Instances of cyber-attacks targeting critical infrastructures, such as those observed on nuclear facilities in Iran, the Ukrainian power grid, and natural gas pipeline companies in the US, emphasize the significance of implementing effective security strategies for such critical systems. Consequently, there has been a heightened focus on strengthening the security of operational technology (OT) and industrial control system environments. While current OT security solutions primarily rely on defensive measures such as monitoring and network segmentation, implementing offensive security practices, which have demonstrated effectiveness in IT systems, remains challenging in OT environments due to their sensitive nature and high availability requirements.

Offensive security practices such as Pen-testing, and Breach and Attack Simulations (BAS) have proved very helpful when security professionals try to penetrate their systems, find vulnerabilities, and patch them before they are exploited by adversaries. Unfortunately, this cannot be conducted in OT networks. OT devices are considered weak and are believed to be shut down even by simple ping sweeps, rendering them un-functional and halting production lines or power distributions. Moreover, these systems require high availability and thus make offensive security measures, like Red Teaming, a non-viable option.

There may be no work done so far to assess the capabilities of the OT security controls that are installed i.e. Monitoring solutions, and IDS. For example, an assessment of the behavior of security controls in case malware drops onto the network, or if an attack is carried out, an assessment of the ability of monitoring tools to correctly detect that specific malware and generate an alert, or an assessment of ability of the firewall to block any attempt of connection to internal OT network from outside. To know the resilience of the security controls, all these assessments should be made and the only way to do it is to emulate real attacks/malware activity in the network, and find out the capabilities of these tools, their strengths and blind spots, if any.

To address this significant gap and empower experts to conduct offensive security measures within OT networks, the concept of Digital Twins emerged as a promising solution. Digital Twins are virtual replicas that act and behave as real Systems/Services. These virtual replicas have diverse applications including predictive maintenance, remote monitoring, product design optimization, process improvement, verification, and validation of industrial automation systems as well as security testing. However, the progress in developing virtual replicas that accurately simulate real environments may be limited. Moreover, the manual work and complexity involved in creating such replicas pose additional challenges.

Some of the available platforms/tools that work in the industrial control system risk assessment space, may be the following.

RadiFlow's CIARA is an OT Risk management platform that considers the use of Digital twin in OT risk assessment, the iSID component builds a digital image of the OT network through passive scanning. By scanning the network CIARA identifies the devices that are present in the network, their interconnections, and some details about the devices i.e. device type, vendor, firmware version, Mac address, and so on. CIARA's risk assessment is based on the following three Parameters.

1) CVEs: For each identified asset, the CVEs related to the firmware are identified, and scored. The higher the score, the higher the overall risk.
2) Countermeasures: Security measures installed in the OT Network, the guards that are put in place for each asset or whole business functions are identified and the score is calculated, the higher the score, the lower the overall risk.
3) Breach & Attack Simulations (BAS): The digital image generated by the iSID component is used to perform Breach & Attack Simulations, and Scores are calculated. The BAS is only limited to finding out what network paths can be followed to reach specific devices, rather than real attack simulations. Also, the digital image that is created is only around 15-20% of the network and not a digital twin that can mimic the overall behavior of the original OT network.

Dragos is a leading OT security solution provider, offering a unified platform for asset visibility, vulnerability management, threat detection, and, investigation & response. Continuously updated with specialized OT-specific threat intelligence, Dragos excels in rich asset visibility, accurate vulnerability management, and effective threat detection, enabling swift response through case management tools and prescriptive playbooks.

ICS Security may provide comprehensive protection for OT/ICS assets like Servers, HMIs, PLCs, and RTUs. It offers two main security mechanisms: Graphene IDS, which includes asset discovery, behavioral monitoring, intrusion detection, and network access control, and Sparta HMI Add-on, offering a holistic approach to prevent attacks on servers, ensure NERC-SIP NIST compliance, and protect HMIs from unauthorized access to lower-level devices (PLCs, RTUs).

ScadaFence may offer key features such as automated asset visibility, real-time threat detection, remote access security, user activity management, and vulnerability management & prioritization, making it a robust and comprehensive solution for OT/ICS security.

DarkTrace is a comprehensive solution that protects complex industrial environments at every level of the Purdue model. It utilizes Self-Learning AI to identify abnormal activities and detect potential threats. The platform maps to MITRE ATT&CK & NIST, ensuring enhanced security capabilities. DarkTrace Detect identifies assets, comprehends specialized OT and hybrid IT/OT contexts, and conducts autonomous investigations, while DarkTrace Respond autonomously responds to threats and can be configured to align with operational requirements. The platform actively integrates with the existing security stack and supports human intervention when needed.

Checkpoint is another player in the OT Security space that passively monitors OT networks to discover asset types, associated risks, attack vectors, and baseline behavior. Users may view all assets classified based on their risk level and drill down for a risk analysis per asset.

Tenable.OT gathers far more information than passive monitoring alone, including identification of devices that rarely communicate on your network, without impacting their operation. The platform generates vulnerability and risk levels using Predictive Prioritization for each asset in the ICS network. Provides detailed Insights, Risk Scores, and prioritized mitigation suggestions. Tenable.OT natively integrates with SIEM. Log management tools, NG-Firewalls, and Ticketing systems to manage and measure cyber risk across OT and IT systems, and may provide complete visibility into converged attack surface.

Claroty uses Active and Passive Scanning, AppDB, and comprehensive asset discovery. After defining granular communication profiles and behavioral baselines, Claroty continuously monitors and correlates your assets and operations with the latest vulnerability, EOL, and other indicators of operational risk.

The above information disclosed in this background section is only for enhancement of understanding of the background of the inventive concept, and, therefore, it may contain information that does not form the prior art that is already known in this country to a person of ordinary skill in the art.

SUMMARY

The present invention discloses a method for security assessment of OT networks and OT security controls testing, comprising creating an OT simulation environment, similar to actual production OT environment to replicate the security posture of a real OT environment; deploying the OT simulation environment as a separate asset where a monitoring system monitors the OT simulation environment and the real OT environment, simultaneously; employing a Breach and Attacks Simulation (BAS) module to perform various types of attacks on virtual assets and protocols within the OT simulation environment; and monitoring both the OT simulation environment and the real OT environment for alerts and security threats during Breach and Attacks Simulation.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain the principles of the inventive concepts.

DESCRIPTION OF THE INVENTION

Figure 1:
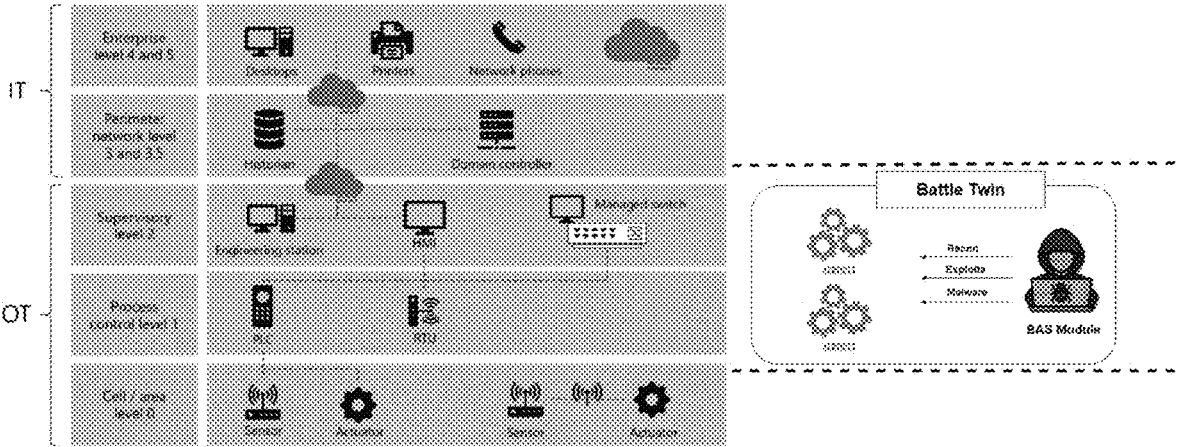
FIG. 1 illustrates a purdue and Battle Twin.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements.

In the accompanying figures, the size and relative sizes of elements may be exaggerated for clarity and descriptive purposes. Also, like reference numerals denote like elements.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, and/or regions, these elements, components, and/or regions should not be limited by these terms. These terms are used to distinguish one element, component, and/or region from another element, component, and/or region. Thus, a first element, component, and/or region discussed below could be termed a second element, component, and/or region without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

The invention discloses a method for security assessment of OT networks and OT security controls testing, comprising: creating an OT simulation environment (hereinafter also called Battle Twin), similar to the actual production OT environment to replicate the security posture of a real OT environment; deploying the OT simulation environment as a separate asset where a monitoring system monitors the OT simulation environment and the real OT environment, simultaneously; employing a Breach and Attacks Simulation (BAS) module to perform various types of attacks on virtual assets and protocols within the OT simulation environment; and monitoring both the OT simulation environment and the real OT environment for alerts and security threats during Breach and Attacks Simulation.

The OT simulation environment is created by a method comprising: acquiring a list of devices with detailed information or monitoring network traffic (SPAN port) to generate data; creating virtual instances of devices in supervisory control layer and process control layer of the Purdue reference model; simulating supervisory control devices by using a first virtual machine having a software-based HMI/SCADA installed on it, and a second virtual machine, the engineer workstation, connected to a first host-only adapter in a first subnet; simulating process control devices, at process control layer, by using, a third virtual machine having a software-based Programmable Logic Control (PLC) installed on it and connected to a second host-only adapter in a second subnet, and a fourth virtual machine connected to the second subnet, running various ICS protocols simulators behaving as real master and slave devices, and sending data packets back and forth; deploying an open-source virtual router to facilitate the communication between devices in different subnets of the OT simulation environment; and implementing various ICS protocols to enable the testing of their vulnerabilities.

The virtual router is configured to connect the first Host-only adapter with the second Host-only adapter to enable communication between the HMI/SCADA and the PLC, placed in different subnets.

The monitoring system is configured to identify the OT simulation environment as a real OT environment where data is being exchanged by various devices using different ICS protocols and generating alerts for any attacks or manipulation with the devices and protocols of the real OT or the OT simulation environment.

The OT simulation environment is managed as a separate business function enabling security analysts to distinguish between the real OT assets and the OT simulation environment assets, and the alerts that are generated therein.

In another embodiment of the invention, the OT simulation environment replicates the security posture of multiple real OT environments and serves as a composite replica, accurately emulating various devices and protocols across multiple real OT environments and distinct OT sites. The OT simulation environment is monitored by a central monitoring system. Each distinct real OT environment incorporates dedicated log collectors or network sensors, responsible for gathering network data within their own environment. The collected data undergoes processing before being transmitted to a centralized monitoring system. The OT simulation environment is strategically deployed within one of the multiple real OT environments, facilitating seamless integration with the network data flow, and wherein the network data originating from these multiple real OT environments and the OT simulation environment is efficiently forwarded to the central monitoring system. In case there is any attack or manipulation with any of the real OT environments or the OT simulation environment, alerts are generated. The OT simulation environment adeptly executes the full spectrum of Industrial Control System (ICS) communication protocols utilized within the real OT environments and eliminates redundancy by refraining from spinning up identical protocols multiple times, and enhances its efficiency of the security assessment by preventing unnecessary duplication of outcomes.

The BAS module deployed at the Supervisory control layer is connected to the internet and configured to perform various types of attacks on the virtual assets and protocols within the OT simulation environment. The device attacks performed by the BAS module may be selected from scanning, device enumeration, brute force, directory enumeration, bypassing authentication, denial of service, operational shutdown, and uploading malicious PLC logic. The protocol attacks performed by the BAS module may be selected from scanning, banner grabbing, reading ID, reading Coil/Register values, writing Coil/Register values, packet replaying, malicious injection, deleting file, function termination, cold restart, and warm restart. The BAS module may further execute malware programs inside the OT simulation environment and replay malware Packet Capture (PCAP) files captured during Sandbox execution of malware.

The outcome of each BAS attack is analyzed to check its success and its impact on the device behavior of the OT simulation environment. Based on the analysis, the vulnerabilities are identified and addressed by mitigation and immunization.

The invention discloses a specialized playground, named as "Battle Twin" (BT), designed specifically for breach and attack simulations tailored to OT networks. Unlike Digital Twin, Battle Twin focuses on mimicking the security posture of the underlying network rather than replicating its production or behavioral aspects. By leveraging Battle Twin, security experts gain the ability to effectively test and evaluate offensive security strategies without direct interaction with real OT environments.

Battle Twin effectively simulates devices that are present inside the real environment and the communication protocols that these devices use to communicate. Moreover, once the Battle Twin is realized the Breach & Attack simulation modules launch attacks against these virtual devices and the protocols that are used for communication. BAS modules have attacks ranging from simple and generic attacks i.e. DoS, Brute Force to highly specific and advanced attacks on the communication protocols. ICS malware is also emulated inside the Battle Twin. These attacks are performed to see the weaknesses of the OT network, the countermeasure installed, and determine the capabilities of IDS/IPS, Monitoring tools that are in place.

The invention addresses the pressing challenges posed by cyber-attacks on industrial control systems and the limitations of existing OT security solutions. Introducing Battle Twin as an innovative solution enables experts to evaluate offensive security strategies within the confines of OT networks while ensuring the protection of sensitive systems and high availability requirements.

The invention discloses a novel concept named Battle Twin and its use to conduct Breach & Attack Simulations. The BAS performed on BT enables us to perform exhaustive security assessment of the OT network as well as the OT security controls.

To spin up the BT, we require either a list of devices with detailed information such as Device Type, Vendor, Firmware, Timestamps, Ip address, Mac Address, etc., or a SPAN port from the OT switch where we passively monitor the traffic and identify all of the information. This Data (Device inventory, Used Protocols) is already available in Monitoring tools like Dragos, Defender for IoT and based on this data the Battle Twin is created. Since the BT can mimic the security posture of the real OT environment, any assessment that is done in the BT is valid for the real network. Any attacks that are successful inside the BT may also be successful in the real environment thus giving a realistic approach to perform Red-Team practicing for OT networks.

Battle Twin: Battle Twin essentially covers the Supervisory control layer and Process control layer of the Purdue reference model as shown in FIG. 1. Virtual instances are created for devices that typically comprise these levels. Supervisory level usually have the Engineering Workstation and Human Machine Interface whereas the Process control layer has Programmable Logic Controls as well as Remote Terminal Units deployed on it. This setting of devices on layer may vary from organization to organization. The lowest level of the Purdue is not considered for simulation because their state is dependent on the coil values of the PLCs that are either 1 or 0, ON or OFF respectively.

Figure 2:
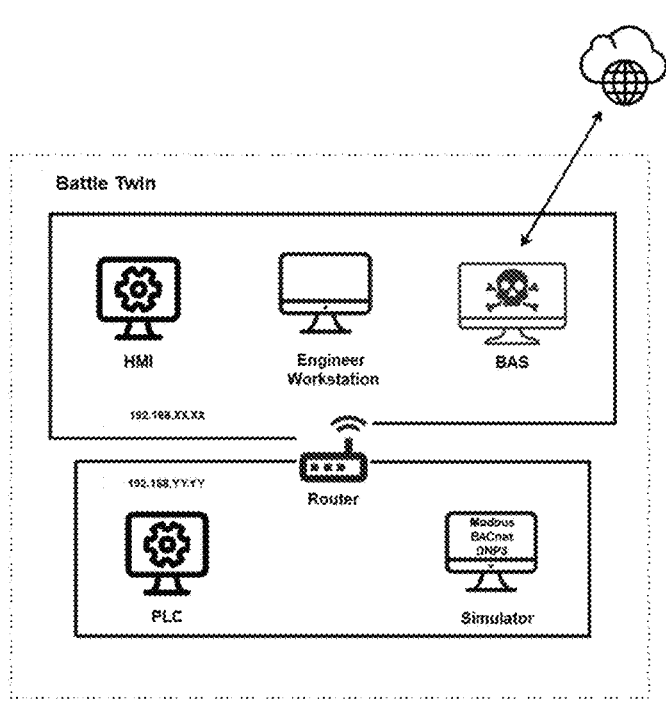
FIG. 2 illustrates the internal architecture of the Battle Twin.

Purdue Level 2/Supervisory control consists of software-based HMI (Human machine interface), SCADA (supervisory controls and data acquisition). The BAS module is also deployed at this layer and is connected to the internet. Meanwhile, Purdue level 1 typically has PLCs (Programmable logic units) & RTUs (remote terminal units) that control the logic of these networks and an engineering workstation. These devices are arranged into different subnets so that they truly reflect two different Purdue layers. To enable communication between devices on different levels, a router is used to provide an interface. FIG. 2 depicts the internal architecture of the Battle Twin.

Simulating Supervisory control devices: To make a virtual HMI and SCADA a software-based HMI and SCADA may be used. This software is installed on Ubuntu server that is a virtual machine in Oracle VirtualBox. The SCADA server is connected to a Host-only adapter and is placed in a dedicated subnet which is for instance (192.168.2.--). Similarly, for the Engineering workstation another Ubuntu desktop virtual machine is installed on the same subnet and configured to the same Host-only adapter. The workstation machine may have all the required software i.e. PLC Editor for writing and uploading programs to the Control device. Web-browser for accessing the SCADA web interface as well as the PLCs web interface.

Simulating Purdue Level 1 devices: To make a virtual PLC, a software-based PLC may be used. This software-based PLC is installed on a Ubuntu server that is a virtual machine in Oracle VirtualBox. This virtual machine is configured to another Host-only adapter setting and is placed in a separate subnet for instance (192.168.1.--). The PLC software has two parts 1) PLC runtime and PLC Editor. The first one is used to compile the Ladder Logic and is accessible via a Web browser, while the latter is a software available in the Engineer workstation and is used to write programs for the PLC.

Virtual Router: As the HMI/SCADA and the PLC are placed in different subnets, thus require a router to enable communication between them. For this purpose an open-source router may be used. The virtual router comes as a separate appliance that can be installed as a virtual machine in Oracle VirtualBox. Router by default expects two interfaces and thus connected to both the Host-only adapters that are 192.168.2.--& 192.168.1--. There may be assigned static IPs to both HMI and the PLC machines using the Router's web console. This connects the virtual PLC & HMI. Wireshark may be used to see if these devices are communicating and when Modbus TCP is used as the communication protocol, the Modbus traffic flow between these devices may be observed.

Simulating ICS Protocols: Since different devices use different protocols and each protocol has its own weaknesses and vulnerabilities, various protocols may be tested. For this purpose, some open-source and in-house protocol simulators may be used that work the same as they would in a real OT network. These protocol simulators have Masters, Slaves, and Outstations that are sending traffic back and forth. The working of all the individual protocols may be verified by capturing their traffic in Wireshark.

Figure 3:
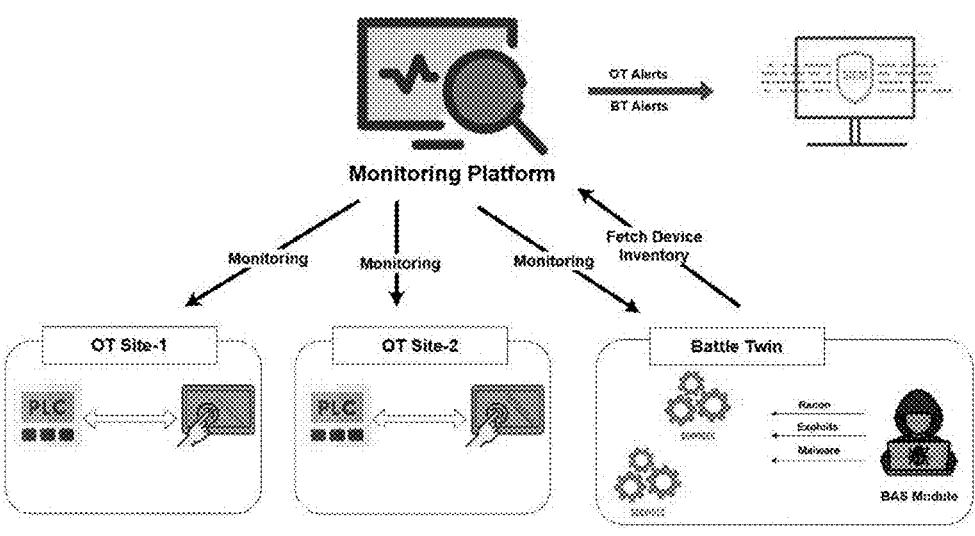
FIG. 3 illustrates the deployment of the Battle Twin.

As shown in FIG. 3, the BT appliance is deployed as a separate asset, a server on one of the interfaces that is monitored by the monitoring system. The monitoring system learns and identifies the BT as a real OT network that has devices (PLC, HMI) and protocols (Modbus, Dnp3, BACnet) up and running. BT is managed as a separate business function in a SIEM so that security Analysts can distinguish the assets and alerts of the real OT and BT and not confuse the attacks on the BT as real attacks. Battle Twin periodically fetches the device inventory to keep itself updated with the underlying OT network.

Once the BT is up and running the BAS module launches several different attacks on this simulated environment. As both the real OT environment and the BT are monitored, any attacks or manipulation with the BT devices and Protocols will cause alerts in the Monitoring platform.

Breach & Attack Simulations: BAS may have several different attack types that target virtual assets such as Engineering Workstation, PLC, HMI, and the ICS protocols Modbus, DNP3, BACnet, these attacks may be the following:

Devices Attacks:

Scanning, Device enumeration; Brute Force: Performed to get the correct; credentials for PLC, HMI web interface; Directory Enumeration; Bypassing Authentication; Denial of Service (SYN Flood, ARP Poisoning); Operational shutdown; and, Uploading malicious PLC Logic.

Protocols Attacks:

Scanning, Banner grabbing (Modbus, DNP3, BACnet), Reading ID, Reading Coil/Register values, Writing Coil/Register values, Packet Replaying, Malicious injection, Delete File, Function termination, Cold Restart, and Warm Restart.

Malware Attacks:

Executing the malware program inside Battle Twin; and replaying malware PCAP file captured during Sandbox execution of malware.

TABLE 1

| Attacks performed in BAS. | | |
| --- | --- | --- |
| Attack | Category | Target |
| Modbus Read ID | Recon | Modbus Protocol |
| Modbus Banner Grabbing | Scan | Modbus Devices |
| Read Coils/Registers | Recon | Modbus Protocol |
| Write Coils/Registers | Injection | Modbus Protocol |
| SSH | Initial Access | PLC, HMI, Workstation |
| Root Access | Privilege Escalation | Workstation |
| Shutdown | — | PLC, HMI |
| Directory Enumeration | Recon | PLC, HMI |
| Login Brute-Force | Brute-Force | PLC, HMI |
| ARP Poisoning | DOS | PLC/HMI |
| Ping Flood | DOS | PLC/HMI |
| Triton | Malware | — |
| Agent Tesla | Malware | — |
| Industroyer | Malware | — |

What is claimed is:

1. A method for security assessment of operational technology (OT) networks and operational technology (OT) security controls testing, comprising:

creating an OT simulation environment, similar to actual production OT environment to replicate security posture of a real OT environment;

deploying the OT simulation environment as a separate asset where a monitoring system monitors the OT simulation environment and the real OT environment, simultaneously;

employing a Breach and Attacks Simulation (BAS) module to perform various types of attacks on virtual assets and protocols within the OT simulation environment; and monitoring both the OT simulation environment and the real OT environment for alerts and security threats during the Breach and Attacks Simulation.

2. The method of claim 1, wherein the OT simulation environment is created by a method comprising:

acquiring a list of devices with detailed information or monitoring network traffic through a Switched Port Analyzer (SPAN) port to generate data;

creating virtual instances of devices in supervisory control layer and process control layer of a Purdue reference model;

simulating supervisory control devices by using a first virtual machine having a software-based HMI/SCADA (Human Machine Interface/Supervisory Controls and Data Acquisition) installed on it, and a second virtual machine, an engineer workstation, connected to a first host-only adapter in a first subnet;

simulating process control devices, at process control layer, by using, a third virtual machine having a software-based Programmable Logic Control (PLC) installed on it and connected to a second host-only adapter in a second subnet, and a fourth virtual machine connected to the second subnet, running various Industrial Control System (ICS) protocols simulators behaving as real master and slave devices, and sending data packets back and forth;

deploying an open-source virtual router to facilitate the communication between devices in different subnets of the OT simulation environment; and implementing various ICS protocols to enable the testing of their vulnerabilities.

3. The method of claim 2, wherein the virtual router is configured to connect the first host-only adapter with the second host-only adapter to enable communication between the HMI/SCADA and the PLC, placed in different subnets.

4. The method of claim 1, wherein the monitoring system is configured to identify the OT simulation environment as a real OT environment where data is being exchanged by various devices using different ICS protocols and generating alerts for any attacks or manipulation with the devices and protocols of the real OT environment or the OT simulation environment.

5. The method of claim 1, wherein the OT simulation environment is managed as a separate business function enabling security analysts to distinguish between real OT assets and OT simulation environment assets, and the alerts that are generated therein.

6. The method of claim 1, wherein the OT simulation environment replicates security posture of multiple real OT environments and serves as a composite replica, accurately emulating various devices and protocols across the multiple real OT environments and distinct OT sites.

7. The method of claim 6, wherein the OT simulation environment is monitored by a central monitoring system.

8. The method of claim 7, wherein each distinct real OT environment incorporates dedicated log collectors or network sensors, responsible for gathering network data within their own environment.

9. The method of claim 8, wherein collected data undergoes processing before being transmitted to a centralized monitoring system.

10. The method of claim 9, wherein the OT simulation environment is strategically deployed within one of the multiple real OT environments, facilitating seamless integration with network data flow, and wherein the network data originating from these multiple real OT environments and the OT simulation environment is efficiently forwarded to the central monitoring system.

11. The method of claim 10, wherein alerts are generated by any attack or manipulation with any of the real OT environments or the OT simulation environment.

12. The method of claim 11, wherein the OT simulation environment adeptly executes full spectrum of Industrial Control System (ICS) communication protocols utilized within the real OT environments.

13. The method of claim 1, wherein the BAS module deployed at a Supervisory control layer is connected to the internet and configured to perform various types of attacks on the virtual assets and protocols within the OT simulation environment.

14. The method of claim 13, wherein the BAS module performs device attacks, selected from scanning, device enumeration, brute force, directory enumeration, bypassing authentication, denial of service, operational shutdown, and uploading malicious PLC logic.

15. The method of claim 13, wherein the BAS module performs protocol attacks, selected from scanning, banner grabbing, reading ID, reading Coil/Register values, writing Coil/Register values, packet replaying, malicious injection, delete file, function termination, cold restart, and warm restart.

16. The method of claim 13, wherein the BAS module executes malware programs inside the OT simulation environment and replays malware Packet Capture (PCAP) files captured during Sandbox execution of malware.

17. The method of claim 13, wherein an outcome of each attack is analyzed to check its success and impact on the device behavior of the OT simulation environment.

18. The method of claim 17, wherein, based on analysis, vulnerabilities are identified and addressed by mitigation and immunization.

* * * * *